(12) United States Patent
Yun et al.

(10) Patent No.: US 12,499,823 B2
(45) Date of Patent: Dec. 16, 2025

(54) ELECTRONIC DEVICE COMPRISING DISPLAY, AND OPERATION METHOD THEREOR

(71) Applicant: Samsung Electronics Co., Ltd., Suwon-si (KR)

(72) Inventors: Chuleun Yun, Suwon-si (KR); Hangseok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/906,263

(22) Filed: Oct. 4, 2024

(65) Prior Publication Data

US 2025/0029554 A1    Jan. 23, 2025

Related U.S. Application Data

(63) Continuation of application No. PCT/KR2023/008056, filed on Jun. 12, 2023.

(30) Foreign Application Priority Data

Jun. 17, 2022  (KR) .................. 10-2022-0074097
Sep. 15, 2022  (KR) .................. 10-2022-0116690

(51) Int. Cl.
G09G 3/3208    (2016.01)

(52) U.S. Cl.
CPC ..... *G09G 3/3208* (2013.01); *G09G 2330/028* (2013.01)

(58) Field of Classification Search
CPC ...... G09G 3/3208; G09G 3/3696; G09G 3/20; G09G 2300/0426; G09G 2330/028;
(Continued)

(56) References Cited

U.S. PATENT DOCUMENTS 10,014,778 B1 * 7/2018 Wei .................. H02M 3/1582
11,128,219 B1   9/2021 Hsieh
(Continued)

FOREIGN PATENT DOCUMENTS

CN    102983744 A    3/2013
CN    210722407      6/2020
(Continued)

OTHER PUBLICATIONS

International Search Report for PCT/KR2023/008056 mailed Aug. 28, 2023, 7 pages.
(Continued)

*Primary Examiner* — David Tung
(74) *Attorney, Agent, or Firm* — Nixon & Vanderhye, P.C.

(57) ABSTRACT

An electronic device (201) according to one embodiment may comprise: a display (260); a first converter circuit (245) which includes a non-inverting buckbooster (510) and a charge pump (530) and is configured to supply a negative first bias voltage to the display (260); and a control circuit (220). The control circuit (220), according to one embodiment, can be configured to check a target first bias voltage to be supplied to the display (260). The control circuit (220), according to one embodiment, can be configured to output a first voltage corresponding to half the absolute value of the target first bias voltage to the charge pump (530) by using the non-inverting buckbooster (510). The control circuit (220), according to one embodiment, can be configured to generate a second voltage by inverting the sign of the first voltage and converting the magnitude of the first voltage by a factor of two through the charge pump (530). The control circuit (220), according to one embodiment, can be configured to supply the second voltage to the display (260) as the first bias voltage.

15 Claims, 11 Drawing Sheets

(58) Field of Classification Search
CPC .......... G09G 2330/025; H02M 1/0032; H02M 1/007; H02M 3/071; H02M 3/158; H02M 3/1582; H02M 3/1584; H02M 3/07
See application file for complete search history.

(56) References Cited

U.S. PATENT DOCUMENTS

| | | | |
|---|---|---|---|
| 2002/0034082 A1* | 3/2002 | Yokomizo | H02M 3/07 363/16 |
| 2004/0189095 A1 | 9/2004 | Lin et al. | |
| 2005/0052170 A1* | 3/2005 | Kim | H02M 3/07 323/282 |
| 2005/0248967 A1* | 11/2005 | Coffey | H02M 3/07 363/59 |
| 2011/0204797 A1 | 8/2011 | Lin et al. | |
| 2012/0169744 A1 | 7/2012 | Seo et al. | |
| 2012/0218032 A1* | 8/2012 | Nadimpalli | H02M 3/073 327/536 |
| 2014/0062449 A1 | 3/2014 | Qu et al. | |
| 2014/0176094 A1 | 6/2014 | Yang | |
| 2015/0130867 A1 | 5/2015 | Park et al. | |
| 2017/0040897 A1 | 2/2017 | Zhang et al. | |
| 2019/0311678 A1 | 10/2019 | Lee | |
| 2021/0143733 A1 | 5/2021 | Lee et al. | |
| 2022/0093040 A1 | 3/2022 | Han et al. | |
| 2022/0147092 A1 | 5/2022 | Ripley | |
| 2022/0329152 A1 | 10/2022 | Li | |
| 2023/0163690 A1 | 5/2023 | Park et al. | |

FOREIGN PATENT DOCUMENTS

| | | |
|---|---|---|
| CN | 111862876 A | 10/2020 |
| JP | 2022525491 A | 5/2022 |
| KR | 10-2009-0043021 | 5/2009 |
| KR | 10-2011-0097569 | 8/2011 |
| KR | 10-2013-0026804 | 3/2013 |
| KR | 101267039 B1 | 5/2013 |
| KR | 101369173 B1 | 3/2014 |
| KR | 101745418 B1 | 6/2017 |
| KR | 20180088134 A | 8/2018 |
| KR | 20230006275 A | 1/2023 |

OTHER PUBLICATIONS

Written Opinion of the ISA for PCT/KR2023/008056 mailed Aug. 28, 2023, 5 pages.
Extended European Search Report dated Mar. 20, 2025 issued in European Patent Application No. 23729646.2.

* cited by examiner (a)

(b)

though which we are incorporated by reference herein in their entireties.

ELECTRONIC DEVICE COMPRISING DISPLAY, AND OPERATION METHOD THEREOR

CROSS-REFERENCE TO RELATED APPLICATIONS

This application is a continuation of International Application No. PCT/KR2023/008056 designating the United States, filed on Jun. 12, 2023, in the Korean Intellectual Property Receiving Office and claiming priority to Korean Patent Application Nos. 10-2022-0074097, filed on Jun. 17, 2022, and 10-2022-0116690, filed on Sep. 15, 2022, in the Korean Intellectual Property Office, the disclosures of all of which are incorporated by reference herein in their entireties.

BACKGROUND

Field

The disclosure relates to an electronic device including a display and a method of operating the same.

Description of Related Art

An electronic device may provide various screens through a display. The electronic device may include an organic light emitting diode (OLED) display as well as a liquid crystal display (LCD) to provide a natural image or screen.

The OLED display may receive panel driving voltages (e.g., ELVDD and ELVSS) from a power management integrated circuit (PMIC), for driving. For example, ELVDD may be a positive bias voltage for driving a display panel included in the OLED display. ELVSS may be a negative bias voltage for driving the display panel included in the OLED display.

The electronic device may include a converter circuit that converts a voltage to generate a panel driving voltage. Various types of converter circuits are available to efficiently generate a panel driving voltage.

SUMMARY

An electronic device according to an embodiment includes a display including a display panel, a first converter circuit including a non-inverting buckbooster and a charge pump and configured to supply a negative first bias voltage to the display panel, and a control circuit. The control circuit according to an embodiment is configured to identify a target first bias voltage to be supplied to the display panel. The control circuit according to an embodiment is configured to output a first voltage corresponding to half of an absolute value of the target first bias voltage to the charge pump, using the non-inverting buckbooster. The control circuit according to an embodiment is configured to generate, through the charge pump, a second voltage by reversing a sign of the first voltage and by converting a magnitude of the first voltage by a factor of two. The control circuit according to an embodiment is configured to supply the second voltage as the first bias voltage to the display panel.

In a method of operating an electronic device according to an embodiment, the electronic device include a display including a display panel and a first converter circuit configured to supply a negative first bias voltage to the display panel, and the first converter circuit includes a non-inverting buckbooster and a charge pump. The method of operating the electronic device according to an embodiment includes identifying a target first bias voltage to be supplied to the display panel. The method of operating the electronic device according to an embodiment includes outputting a first voltage corresponding to half of an absolute value of the target first bias voltage to the charge pump, using the non-inverting buckbooster. The method of operating the electronic device according to an embodiment includes generating, through the charge pump, a second voltage by reversing a sign of the first voltage and converting a magnitude of the first voltage by a factor of two. The method of operating the electronic device according to an embodiment includes supplying the second voltage as the first bias voltage to the display panel.

DETAILED DESCRIPTION

Figure 1:
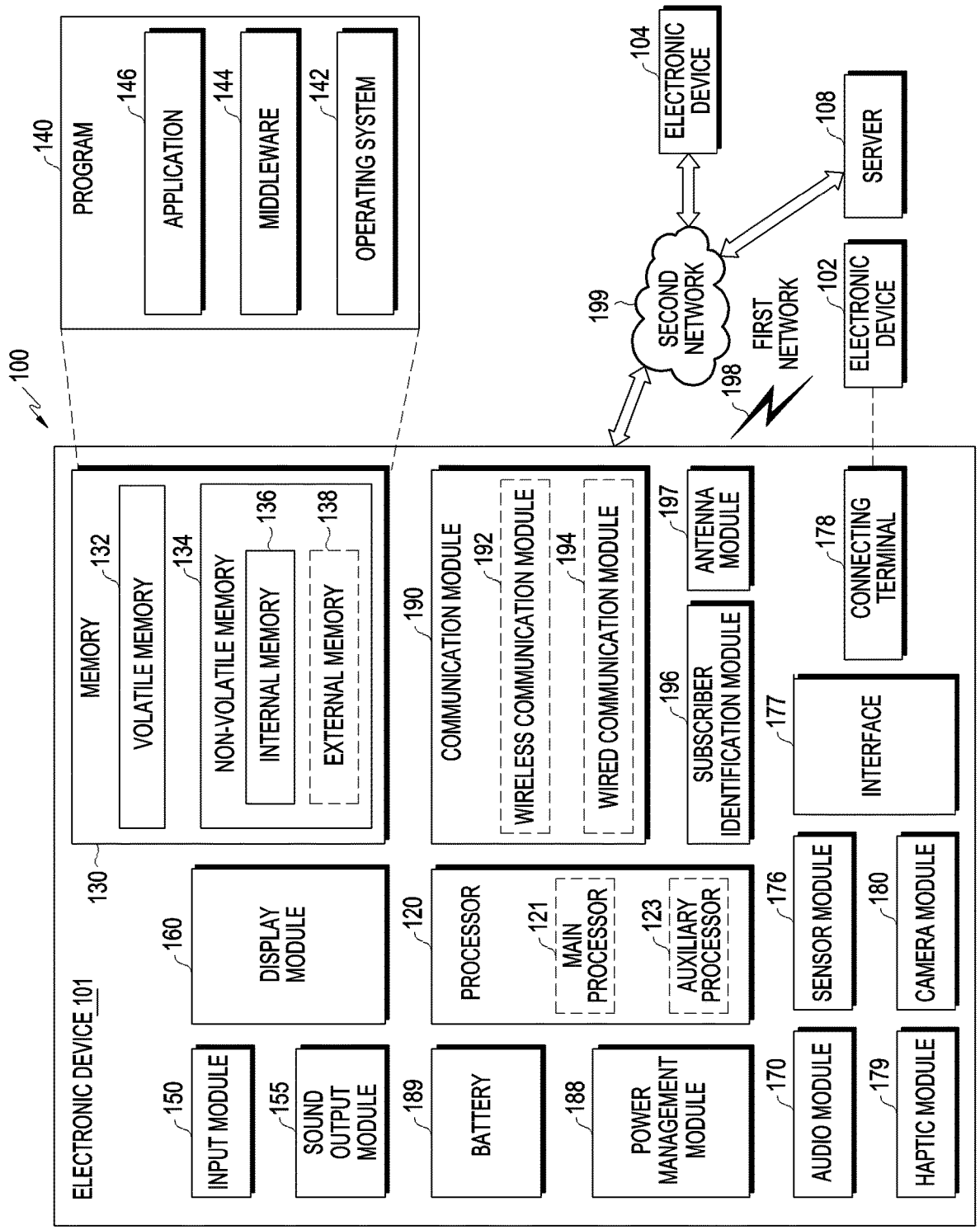
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
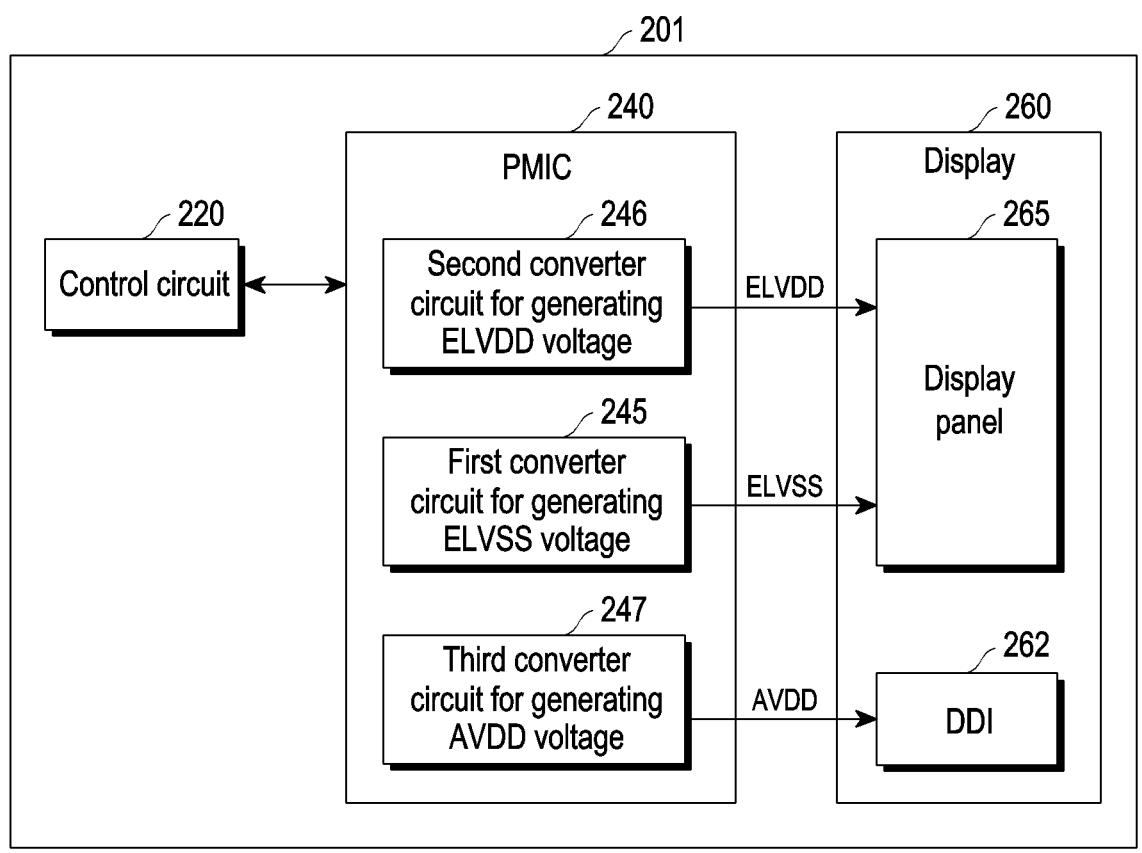
FIG. 2 is a block diagram illustrating a schematic configuration of an electronic device according to an embodiment.

FIG. 2 is a block diagram illustrating a schematic configuration of an electronic device according to an embodiment.

Referring to FIG. 2, an electronic device 201 may include a control circuit 220, a PMIC 240, and a display 260. For example, the electronic device 201 may be implemented the same as or similar to the electronic device 101 of FIG. 1.

According to an embodiment, the display 260 may include a display driver integrated circuit (DDI) 262 and a display panel 265. For example, the display 260 may be implemented as an organic light emitting diode (OLED) display.

According to an embodiment, the DDI 262 may control the operation of the display panel 265. The DDI 262 may receive an AVDD voltage from the IC 240, for driving.

According to an embodiment, the display panel 265 may receive panel driving voltages (e.g., ELVDD and ELVSS) from the PMIC, for driving. For example, the display panel 265 may be implemented as an OLED display panel.

According to an embodiment, the control circuit 220 may provide overall control to operations of the PMIC 240. Although the control circuit 220 is shown in FIG. 2 as included outside the PMIC 240, the control circuit 220 may be included inside the PMIC 240 depending on implementation. Depending on implementation, the control circuit 220 may be implemented the same as or similar to the processor 120 of FIG. 1.

According to an embodiment, the control circuit 220 may identify a target ELVDD voltage and a target ELVSS voltage to be supplied to the display panel 265 through the PMIC 240. For example, the ELVDD voltage may refer to a positive bias voltage supplied to the display panel 265 to drive the display panel 265. The ELVSS voltage may refer to a negative bias voltage supplied to the display panel 265 to drive the display panel 265. For example, the target ELVDD voltage and the target ELVSS voltage may be determined by the control circuit 220 or a processor (not shown) included in the electronic device 201 (e.g., the processor 120 of FIG. 1).

According to an embodiment, the control circuit 220 may identify a target AVDD voltage to be supplied to the DDI 260 through the PMIC 240. For example, the AVDD voltage may refer to a voltage supplied to the DDI 262 to drive the DDI 262.

According to an embodiment, the PMIC 240 may include a first converter circuit 245, a second converter circuit 246, and a third converter circuit 247. For example, the PMIC 240 may supply power to the display 260 under the control of the control circuit 220.

According to an embodiment, the first converter circuit 245 may generate the negative bias voltage (or ELVSS voltage) applied to the display panel 265. For example, the first converter circuit 245 may function as a direct current-direct current (DC-DC) converter. For example, the first converter circuit 245 may include a buck-boost converter. For example, the first converter circuit 245 may include a boost converter (e.g., a non-inverting buckbooster) and a charge pump (or charging pump). The first converter circuit 245 may generate the negative bias voltage (e.g., ELVSS voltage or target ELVSS voltage) applied to the display panel 265 through a two-stage configuration including the boost converter and the charge pump. For example, the first converter circuit 245 may convert a DC voltage applied through a power source (e.g., an internal battery (not shown) or external power source (not shown) of the electronic device 201) into an ELVSS voltage (or the target ELVSS voltage). The first converter circuit 245 may supply or output the ELVSS voltage to the display panel 265.

According to an embodiment, the second converter circuit 246 may generate the positive bias voltage (or ELVDD voltage) applied to the display panel 265. For example, the second converter circuit 246 may function as a DC-DC converter. For example, the second converter circuit 246 may be implemented as a boost converter (e.g., a buck-boost converter). For example, the second converter circuit 246 may convert a DC voltage applied through the power source (e.g., the internal battery (not shown) or external power source (not shown) of the electronic device 201) into an ELVDD voltage (or the target ELVDD voltage). The second converter circuit 246 may supply or output the ELVDD voltage to the display panel 265.

According to an embodiment, the third converter circuit 247 may generate the AVDD voltage. For example, the third converter circuit 247 may function as a DC-DC converter. For example, the third converter circuit 247 may convert a DC voltage applied through the power source (e.g., the internal battery (not shown) or external power source (not shown) of the electronic device 201) into the AVDD voltage (or target ELVDD voltage). The third converter circuit 247 may supply or output the AVDD voltage to the DDI 262.

Figure 3A:
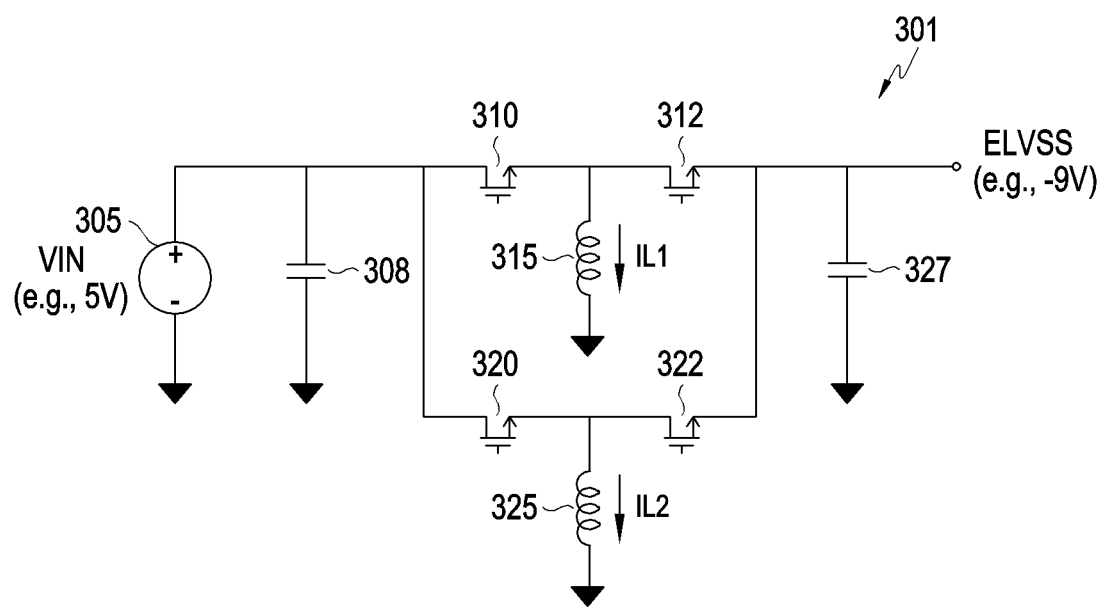
FIG. 3A is a diagram illustrating a first converter circuit including an inverting buckbooster according to an embodiment.

FIG. 3A is a diagram illustrating a first converter circuit including an inverting buckbooster according to an embodiment.

Referring to FIG. 3A, according to an embodiment, a first converter circuit 301 (e.g., the first converter circuit 245 of FIG. 2) may be implemented as an inverting buckbooster.

According to an embodiment, the inverting buckbooster may include an input power source 305, a plurality of capacitors 308 and 327, a plurality of transistors 310, 312, 320 and 322, and a plurality of inductors 315 and 325.

According to an embodiment, the inverting buckbooster may output a negative ELVSS voltage (e.g., −9V) based on a positive input voltage VIN (e.g., 5V). A current IL1 or IL2 may be conducted in each of the plurality of inductors 315 and 325. However, the magnitude (e.g., 2.05 A) of the current IL1 or IL2 conducted in each of the plurality of inductors 315 and 325 may be greater than the magnitude (e.g., 0.75 A) of an output current of the inverting buckbooster. For example, the total magnitude of the currents IL1 and IL2 conducted in the plurality of inductors 315 and 325 may be 4.1 A. Accordingly, the plurality of inductors 315 and 325 may be designed to withstand a high current and have a large size. In addition, a voltage difference (e.g., 14V) between the input voltage VIN (e.g., 5V) and the ELVSS voltage (e.g., −9V) may be applied to the transistor 312 or 322 disposed between the inductor 315 or 325 and an output terminal. Therefore, the transistors 312 and 322 disposed between the inductors 315 and 325 and the output terminal may be designed as devices with a high withstanding voltage to withstand the voltage difference.

Accordingly, there may be a need for a converter circuit capable of reducing the magnitudes of currents conducted in the plurality of inductors 315 and 325 and the magnitudes of voltages applied to the transistors 312 and 322.

Figure 3B:
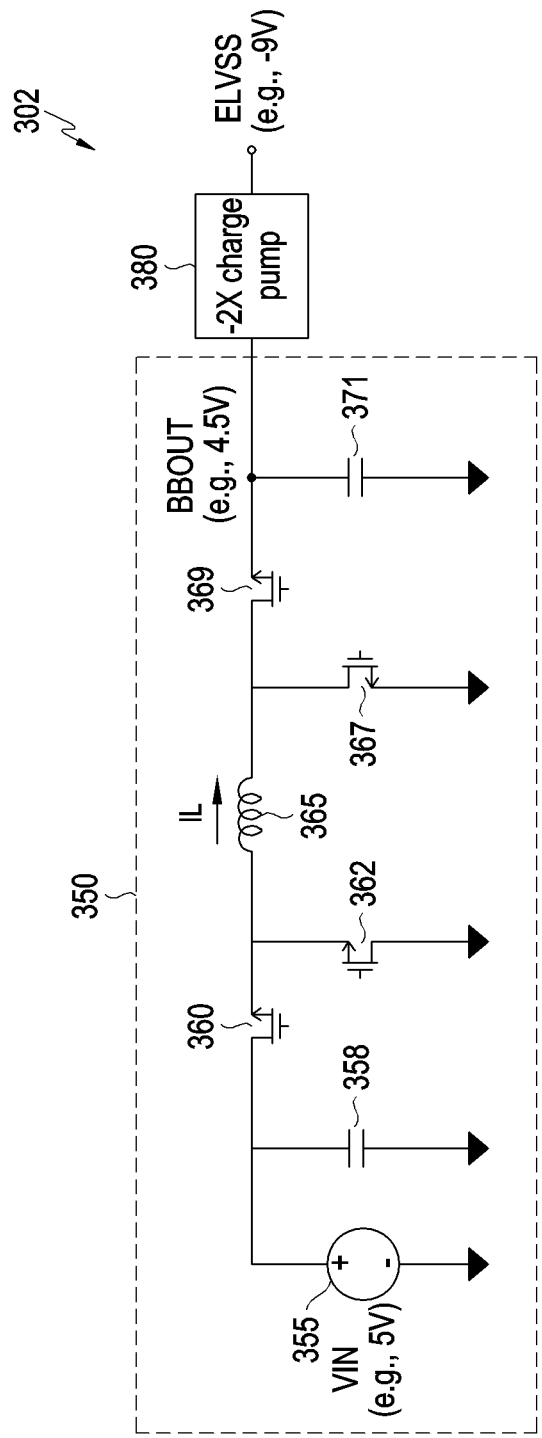
FIG. 3B is a diagram illustrating a first converter circuit including a non-inverting buckbooster according to an embodiment.

FIG. 3B is a diagram illustrating a first converter circuit including a non-inverting buckbooster according to an embodiment.

Referring to FIG. 3B, according to an embodiment, a first converter circuit 302 (e.g., the first converter circuit 245 of FIG. 2) may be implemented to include a non-inverting buckbooster 350 and a charge pump 380.

According to an embodiment, the non-inverting buckbooster may include an input power source 305, a plurality of capacitors 358 and 371, a plurality of transistors 360, 362, 367, and 369, and an inductor 365.

According to an embodiment, the non-inverting buckbooster may output a positive first voltage BBOUT (e.g., 4.5V) based on a positive input voltage VIN (e.g., 5V). For example, the first voltage BBOUT may be a voltage corresponding to half of the absolute value of a target ELVSS voltage (e.g., −9V). A current IL may be conducted in the inductor 365. The magnitude (e.g., 1.57 A) of the current IL conducted in the inductor 365 may be greater than the magnitude (e.g., 0.75 A) of an output current of the inverting buckbooster. However, the magnitude (e.g., 1.57 A) of the current IL conducted in the inductor 365 may be less than the magnitude (e.g., 4.1 A) of the currents conducted in the inductors 315 and 325 included in the inverting buckbooster of FIG. 3A. A). In addition, since a voltage difference between the input voltage (e.g., 5V) and the first voltage BBOU) (e.g., 4.5V) is not large, a low voltage may be applied to the transistors 360, 362, 367, and 369. According to this embodiment, because the magnitude (e.g., 1.57 A) of the current IL conducted in the inductor 365 may be less than the magnitude (e.g., 4.1 A) of the currents conducted in the inductors 315 and 325 included in the inverting buckbooster of FIG. 3A, smaller inductors can be used.

According to an embodiment, the charge pump 380 may output a negative ELVSS voltage (e.g., −9V) based on the positive first voltage BBOUT.

According to an embodiment, the first converter circuit 302 (e.g., the first converter circuit 245 of FIG. 2) may generate an ELVSS voltage in a two-stage operation based on the non-inverting buckbooster 350 and the charge pump 380. However, the first converter circuit 302 may overcome shortcomings that may be encountered with the inverting buckbooster of FIG. 3A. For example, the first converter circuit 302 may reduce the magnitude of the current conducted in the inductor 365 and the magnitude of the voltage applied to the transistors 360, 362, 367, and 369.

Accordingly, the first converter circuit 245 according to an embodiment of the disclosure may be implemented with the non-inverting buckbooster 350 and the charge pump 380 as illustrated in FIG. 3B. For example, the first converter circuit 245 of the disclosure may generate the ELVSS voltage in the two-stage operation based on the non-inverting buckbooster 350 and the charge pump 380, as illustrated in FIG. 3B. Accordingly, the first converter circuit 245 according to an embodiment of the disclosure may operate by eliminating auxiliary circuits such as low-dropout regulators and using a single integrated controller with the non-inverting buckbooster 350 targeting the charge pump 380 output voltage. This reduces the losses in the auxiliary circuitry and the need to unnecessarily increase the positive first voltage BBOUT.

At least some of the operations of the electronic device 201 described below may be performed by the control circuit 220. However, for convenience of description, the corresponding operations will be described as performed by the electronic device 201.

Figure 4:
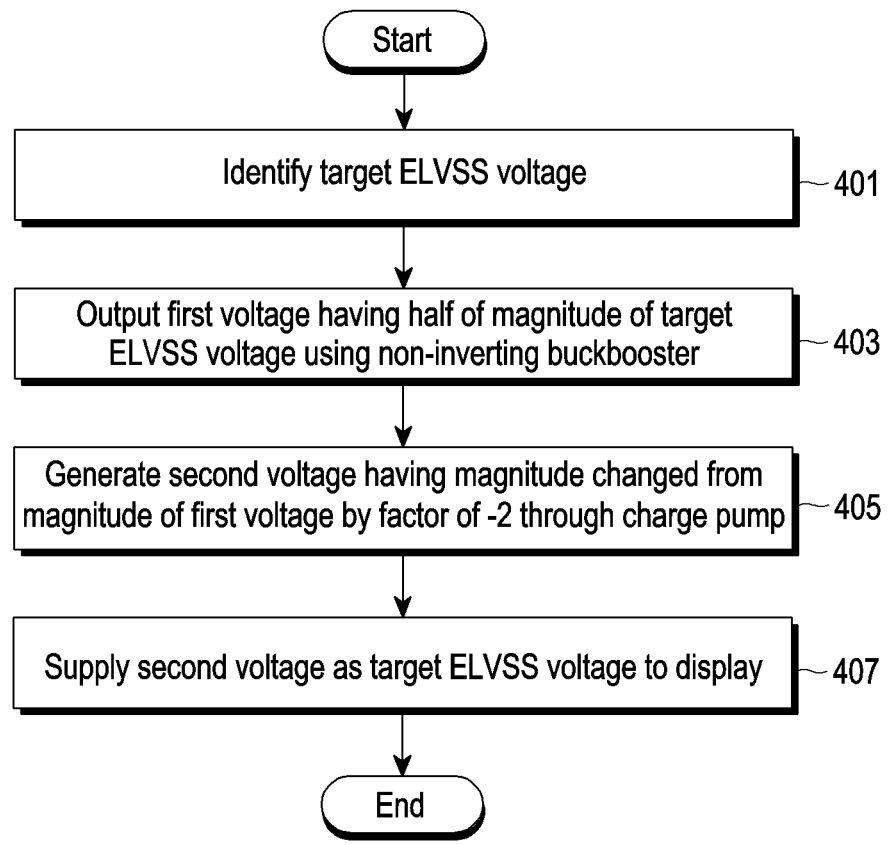
FIG. 4 is a flowchart illustrating an operation of supplying an ELVSS voltage to a display according to an embodiment.

FIG. 4 is a flowchart illustrating an operation of supplying an ELVSS voltage to a display according to an embodiment.

Referring to FIG. 4, according to an embodiment, the electronic device 201 (e.g., the electronic device 201 of FIG. 2) may identify a target ELVSS voltage to be supplied to the display panel 265 in operation 401.

According to an embodiment, the electronic device 201 may output a first voltage having half of the absolute value of the target ELVSS voltage to the charge pump 380 included in the first converter circuit 245 using the non-inverting buckbooster included in the first converter circuit 245 in operation 403.

According to an embodiment, the electronic device 201 may generate a second voltage obtained by changing the magnitude of the first voltage by a factor of −2 through the charge pump included in the first converter circuit 245 in operation 405. For example, the charge pump included in the first converter circuit 245 may be implemented as a −2× charge pump capable of changing an input voltage by a factor of −2. For example, the second voltage may be equal to or almost similar to the target ELVSS voltage.

According to an embodiment, the electronic device 201 may supply the second voltage as the target ELVSS voltage to the display 260 (or the display panel 265) in operation 407.

Therefore, the electronic device 201 may supply the ELVSS voltage to the display panel 265 without using an inverting buckbooster. As described with reference to FIG. 3A, the electronic device 201 may overcome shortcomings that may be encountered with the inverting buckbooster.

Figure 5:
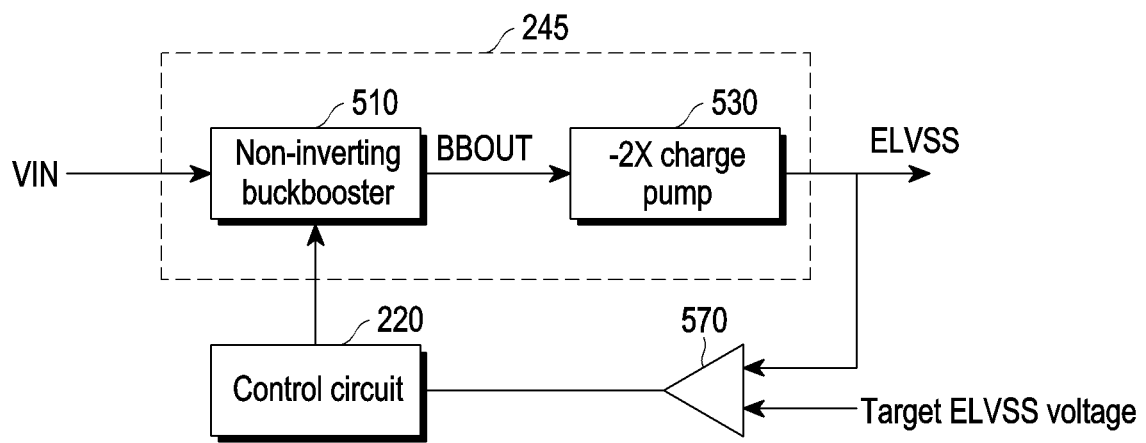
FIG. 5 is a block diagram illustrating a first converter circuit that generates an ELVSS voltage according to an embodiment.

FIG. 5 is a block diagram illustrating a first converter circuit that generates an ELVSS voltage according to an embodiment.

Referring to FIG. 5, according to an embodiment, the control circuit 220 may identify or determine a target ELVSS voltage to be supplied to the display panel 265.

According to an embodiment, the control circuit 220 may generate the target ELVSS voltage through the first converter circuit 245. The control circuit 220 may supply the target ELVSS voltage generated through the first converter circuit 245 to the display panel 265.

According to an embodiment, the first converter circuit 245 may include a non-inverting buckbooster 510 and a −2× charge pump 530. For example, an output terminal of the non-inverting buckbooster 510 may be connected (e.g. directly connected) to an input terminal of the −2× charge pump 530.

According to an embodiment, the non-inverting buckbooster 510 may receive an input voltage VIN. The non-inverting buckbooster 510 may output a first voltage BBOUT based on the input voltage VIN. For example, the non-inverting buckbooster 510 may output a first voltage BBOUT having a magnitude less than or equal to the input voltage VIN in a first mode (e.g., buck mode). In a second mode (e.g., boost mode), the non-inverting buckbooster 510 may output a first voltage BBOUT having a magnitude equal to or greater than the input voltage VIN. When the target ELVSS voltage is about −9V and the input voltage VIN is about 5V, the non-inverting buckbooster 510 may output a first voltage BBOUT having a magnitude of about 4.5V.

According to an embodiment, the −2× charge pump 530 may receive the first voltage BBOUT output from the non-inverting buckbooster 510. The −2× charge pump 530 may generate and output a second voltage ELVSS based on the first voltage BBOUT. For example, the −2× charge pump 530 may generate and output the second voltage ELVSS by changing the magnitude of the first voltage BBOUT by a factor of 2 while changing the phase of the first voltage BBOUT by 180 degrees. For example, the −2× charge pump 530 may generate and output the second voltage ELVSS by changing the magnitude of the first voltage BBOUT by a factor of −2. For example, when the target ELVSS voltage is about −9V and the first voltage BBOUT is about 4.5V, the −2× charge pump 530 may output a second voltage ELVSS having a magnitude of about −9V.

According to an embodiment, the control circuit 220 may supply the second voltage ELVSS corresponding to the target ELVSS voltage to the display panel 265.

According to an embodiment, the control circuit 220 may monitor the ELVSS voltage supplied to the display panel 265. For example, the control circuit 220 may identify a difference between the target ELVSS voltage and the current ELVSS voltage supplied to the display panel 265 through a comparator 570.

According to an embodiment, the comparator 570 may receive the current ELVSS voltage supplied to the display panel 265 through a first input terminal, and receive the target ELVSS voltage through a second input terminal. The comparator 570 may output a signal representing a difference between the target ELVSS voltage and the current ELVSS voltage supplied to the display panel 265 to the control circuit 220. Although the comparator 570 is shown as a separate component in FIG. 5, the control circuit 220 may perform the function of the comparator 570. In this case, the comparator 570 may not be included as a component separate from the electronic device 201.

According to an embodiment, when identifying that the absolute value of the ELVSS voltage supplied to the display panel 265 is less than the absolute value of the target ELVSS voltage, the control circuit 220 may control the non-inverting buckbooster 510 so that the −2× charge pump 530 outputs the second voltage ELVSS corresponding to the target ELVSS voltage. For example, the control circuit 220 may transmit a control signal to the non-inverting buckbooster 510 to increase the magnitude of the first voltage BBOUT output from the non-inverting buckbooster 510.

According to an embodiment, when identifying that the absolute value of the ELVSS voltage supplied to the display panel 265 is greater than the absolute value of the target ELVSS voltage, the control circuit 220 may control the non-inverting buckbooster 510 so that the −2× charge pump 530 outputs the second voltage ELVSS corresponding to the target ELVSS voltage. For example, the control circuit 220 may transmit a control signal to the non-inverting buckbooster 510 to decrease the magnitude of the first voltage BBOUT output from the non-inverting buckbooster 510.

As described above, the control circuit 220 may control an output voltage (e.g., the first voltage BBOUT) of the non-inverting buckbooster 510 in order to supply the target ELVSS voltage (or the voltage corresponding to the target ELVSS voltage) to the display panel 265. Therefore, the electronic device 201 may supply the target ELVSS voltage to the display panel 265 even though it does not include a separate regulator (e.g., low drop out (LDO)) at an output terminal of the −2× charge pump 530.

Figure 6:
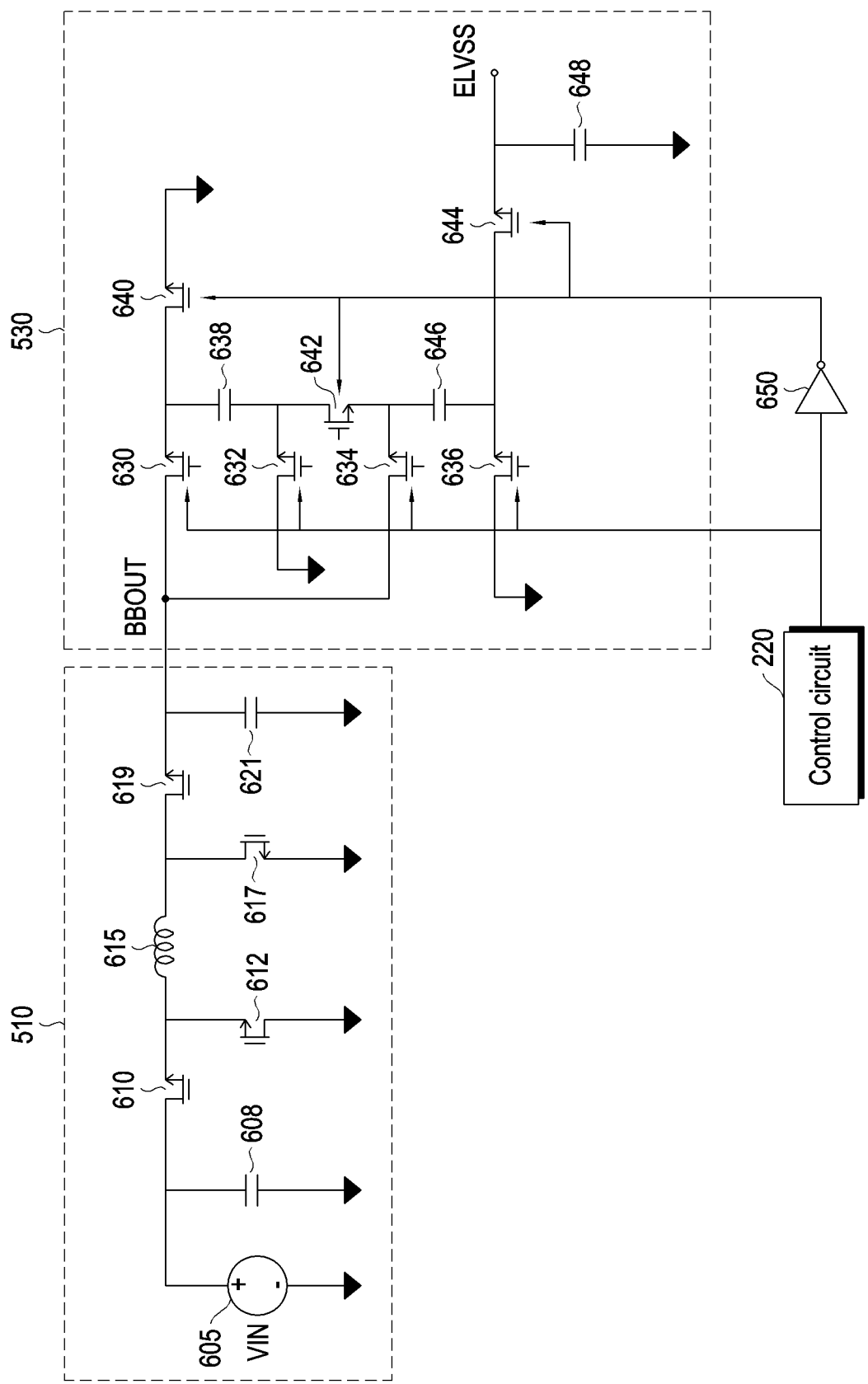
FIG. 6 is a diagram illustrating a non-inverting buckbooster and a charge pump included in a first converter circuit according to an embodiment.

FIG. 6 is a diagram illustrating a non-inverting buckbooster and a charge pump included in a first converter circuit according to an embodiment.

Referring to FIG. 6, according to an embodiment, the non-inverting buckbooster 510 may include an input power source 605, a plurality of capacitors 608 and 621, a plurality of transistors 610, 612, 617, and 619, and an inductor 615. For example, the plurality of transistors 610, 612, 617, and 619 may be implemented as field effect transistors or metal-oxide-semiconductor field-effect transistors (MOSFETs). For example, the plurality of transistors 610, 612, 617, and 619 may be implemented with N-type MOSFETs (or NMOSes).

According to an embodiment, the input power source 605 may be based on power applied from a battery (not shown) included in the electronic device 201 or from the outside. The capacitor 608 may be connected in parallel between the input power source 605 and the transistor 610. The transistor 610 may have one end connected (e.g. directly connected) to the capacitor 608 and the input power supply 605 and the other end connected (e.g. directly connected) to the transistor 612 and the inductor 615. The transistor 612 may have one end connected (e.g. directly connected) to the transistor 610 and the inductor 615 and the other end connected (e.g. directly connected) to the ground. The inductor 615 may have one end connected (e.g. directly connected) to the plurality of transistors 610 and 612 and the other end connected (e.g. directly connected) to the plurality of transistors 617 and 619. The transistor 617 may have one end connected (e.g. directly connected) to the transistor 619 and the inductor 615 and the other end connected (e.g. directly connected) to the ground. The transistor 619 may have one end connected (e.g. directly connected) to the capacitor 621 and an output terminal of the non-inverting buckbooster 510 and the other end connected (e.g. directly connected) to the transistor 617 and the inductor 615.

According to an embodiment, the non-inverting buckbooster 510 may generate and output a first voltage BBOUT based on a positive input voltage VIN supplied from the input power source 605. The plurality of transistors 610, 612, 617, and 619 included in the non-inverting buckbooster 510 may be turned on/off under the control of the control circuit 220.

According to an embodiment, the non-inverting buckbooster 510 may turn off the transistor 617 and turn on the transistor 619 in the first mode (e.g., buck mode). Further, the non-inverting buckbooster 510 may generate and output the first voltage BBOUT while alternately turning on/off the transistor 610 and the transistor 612 in the first mode (e.g., buck mode). In this case, the magnitude of the first voltage BBOUT may be equal to or less than the magnitude of the input voltage VIN from the input power source 605.

According to an embodiment, the non-inverting buckbooster 510 may turn off (or open) the transistor 612 and turn on (or short) the transistor 610 in the second mode (e.g., boost mode). In the second mode (e.g., boost mode), the non-inverting buckbooster 510 may generate and output the first voltage BBOUT, while alternately turning on/off (or shorting/opening) the transistor 617 and the transistor 619. For example, in the second mode, the magnitude of the first voltage BBOUT may be greater than the magnitude of the input voltage VIN from the input power supply 605.

According to an embodiment, the −2× charge pump 530 may include a plurality of capacitors 638, 646, and 648 and a plurality of transistors 630, 632, 634, 636, 640, 642, and 644. For example, each of the plurality of transistors 630, 632, 634, 636, 640, 642, and 644 may be implemented as a field-effect transistor or a MOSFET. For example, each of the plurality of transistors 630, 632, 634, 636, 640, 642, and 644 may be implemented as an N-type MOSFET (or NMOS).

According to an embodiment, the transistor 630 may have one end connected (e.g. directly connected) to the output terminal of the non-inverting buckbooster 510 and the other end connected (e.g. directly connected) to the capacitor 638 and the transistor 640. The transistor 632 may have one end connected (e.g. directly connected) to the capacitor 638 and the transistor 642 and the other end connected (e.g. directly connected) to the ground. The transistor 634 may have one end connected (e.g. directly connected) to the output terminal of the non-inverting buckbooster and the other end connected (e.g. directly connected) to the capacitor 646 and the transistor 642. The transistor 636 may have one end connected (e.g. directly connected) to the capacitor 646 and the transistor 644 and the other end connected (e.g. directly connected) to the ground. The transistor 640 may have one end connected (e.g. directly connected) to the transistor 630 and the capacitor 638 and the other end connected (e.g. directly connected) to the ground. The transistor 644 may have one end connected (e.g. directly connected) to the transistor 636 and the capacitor 646 and the other end connected (e.g. directly connected) to the output terminal of the −2× charge pump 530 and the capacitor 648.

According to an embodiment, the −2× charge pump 530 may generate and output a negative second voltage ELVSS based on the positive first voltage BBOUT. The plurality of transistors 630, 632, 634, 636, 640, 642, and 644 included in the 2X charge pump 530 may be turned on/off under the control of the control circuit 220.

According to an embodiment, the −2× charge pump 530 may generate and output the second voltage ELVSS while alternately turning on/off (or shorting/opening) a plurality of first transistors 630, 632, 634, and 636 and a plurality of second transistors 640, 642, and 644. For example, when the control circuit 220 outputs a signal instructing transistor on (or short), the signal may be applied to the plurality of first transistors 630, 632, 634, and 636. In addition, the signal may be inverted into a signal instructing transistor off (or open) through an inverter 650 and applied to the plurality of second transistors 640, 642, and 644. The second voltage ELVSS may have a magnitude −2 times larger than the magnitude of the first voltage BBOUT. Although the inverter 650 is shown in FIG. 6 as a separate component, the inverter 650 may be included in the control circuit 220 depending on implementation.

Figure 7:
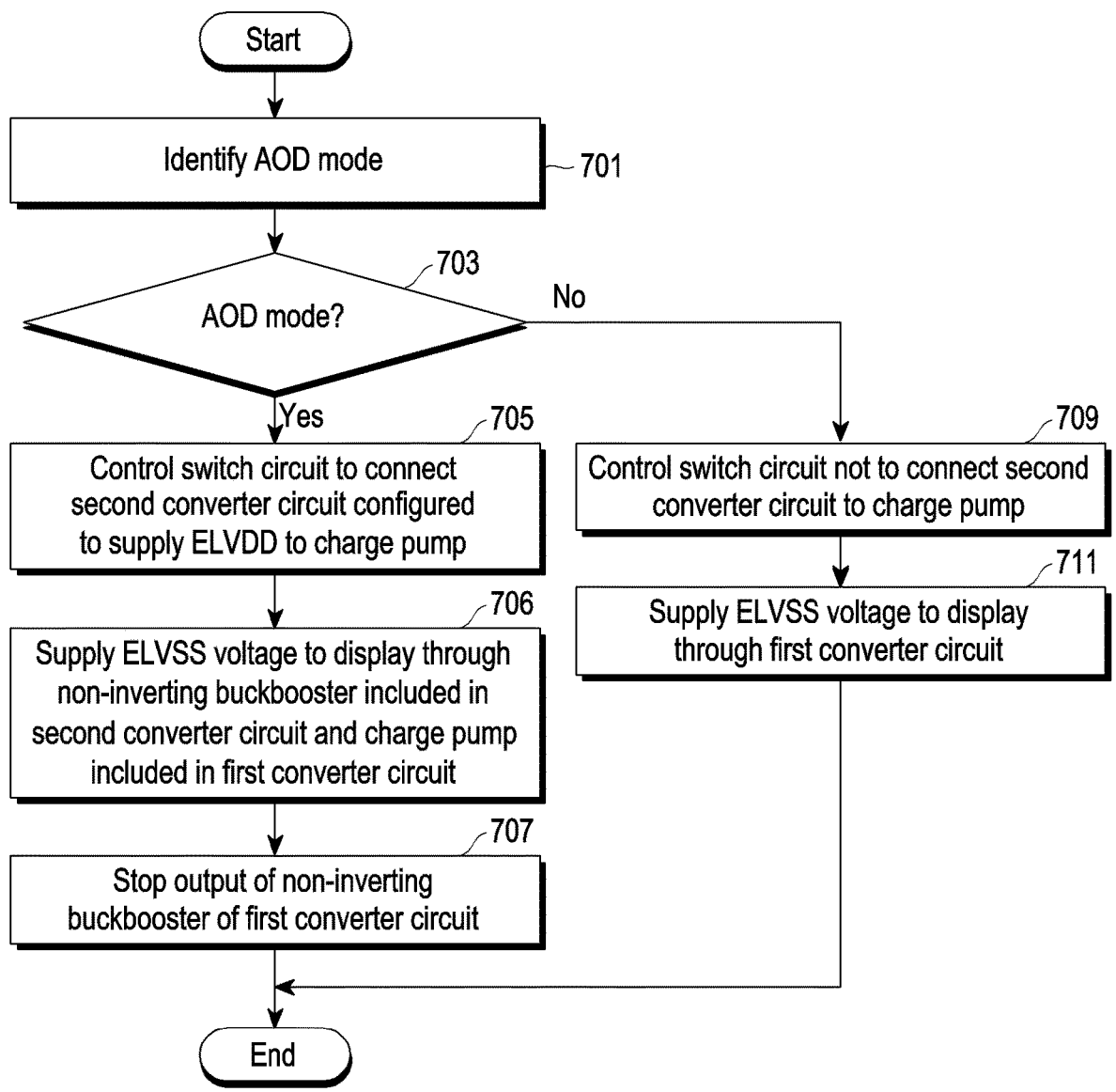
FIG. 7 is a flowchart illustrating an operation of an electronic device in an always on display (AOD) mode according to an embodiment.

FIG. 7 is a flowchart illustrating an operation of an electronic device in an always on display (AOD) mode according to an embodiment.

Referring to FIG. 7, according to an embodiment, the electronic device 201 may identify whether the display 260 is in an AOD mode in operation 701. For example, when the display 260 is in the AOD mode, the electronic device 201 may activate some of all pixels of the display 260 to display specified content even in a standby state.

According to an embodiment, when identifying that the display 260 is in the AOD mode (YES in operation 703), the electronic device 201 may control a switch circuit to connect the second converter circuit 246 configured to supply ELVDD to the display panel 265 to the −2× charge pump 530 included in the first converter circuit 245 in operation 705.

According to an embodiment, the electronic device 201 may supply an ELVSS voltage (or a second voltage corresponding to a target ELVSS voltage) to the display 260 (or the display panel 265) through a non-inverting buckbooster included in the second converter circuit 246 and the −2× charge pump 530 included in the first converter circuit 245 in operation 706.

According to an embodiment, the electronic device 201 may stop the non-inverting buckbooster 510 of the first converter circuit 245 from outputting a first voltage in operation 707. For example, the electronic device 201 may control the non-inverting buckbooster 510 to be in an off state. For example, the electronic device 201 may control the plurality of transistors 610, 612, 617, and 619 included in the non-inverting buckbooster 510 to be in the off (or open) state.

According to an embodiment, when identifying that the display 260 is not in the AOD mode (NO in operation 703), the electronic device 201 may control the switch circuit not to connect the second converter circuit 246 to the −2× charge pump 530 included in the first converter circuit 245 in operation 709. For example, when the display 260 is in a normal mode, the electronic device 201 may control the switch circuit not to connect the second converter circuit 246 to the −2× charge pump 530 included in the first converter circuit 245.

According to an embodiment, the electronic device 201 may supply the ELVSS voltage (or the second voltage corresponding to the target ELVSS voltage) to the display 260 (or the display panel 265) through the first converter circuit 245 (or the non-inverting buckbooster 510 and the −2× charge pump 530) in operation 711.

According to an embodiment, an ELVDD voltage and/or an ELVSS voltage in the normal mode and an ELVDD voltage and/or an ELVSS voltage in the AOD mode may be set to equal or different values.

Figure 8:
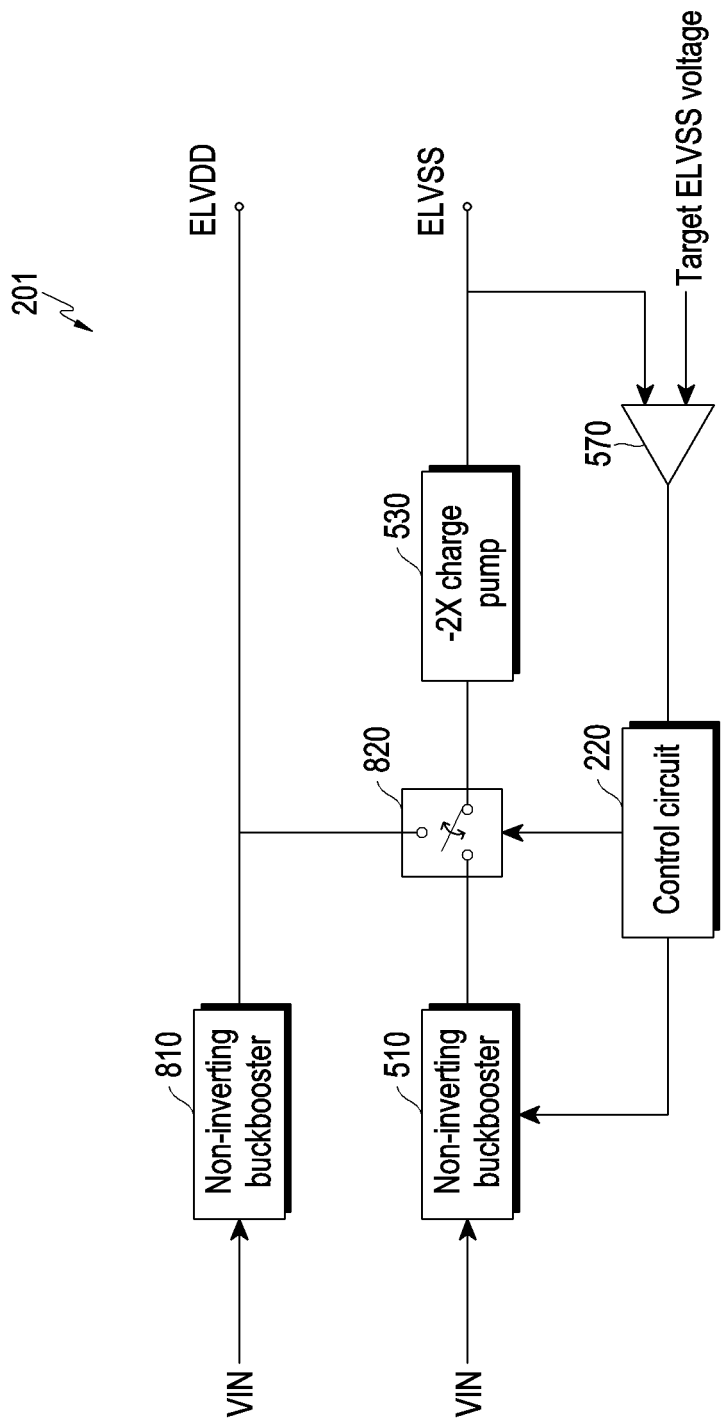
FIG. 8 is a block diagram illustrating a first converter circuit that generate an ELVSS voltage, supporting an AOD mode, and a second converter circuit according to an embodiment.

FIG. 8 is a block diagram illustrating a first converter circuit generating an ELVSS voltage and a second converter circuit, which support the AOD mode according to an embodiment.

Referring to FIG. 8, according to an embodiment, the electronic device 201 may further include a switch circuit 820 disposed between the first converter circuit 245 and the second converter circuit 246. For example, the switch circuit 820 may be implemented as a field-effect transistor or a MOSFET.

According to an embodiment, the first converter circuit 246 may be implemented with the non-inverting buckbooster 510 and the −2× charge pump 530. The second converter circuit 246 may include a non-inverting buckbooster 810.

According to an embodiment, the control circuit 220 may control the switch circuit 820 to connect the non-inverting buckbooster 810 to the −2× charge pump 530 in the AOD mode of the display 260. Alternatively, the control circuit 220 may control the switch circuit 820 to connect the non-inverting buckbooster 510 to the −2× charge pump 530 in the normal mode of the display 250. For example, the control circuit 220 may control the switch circuit 820 so that a voltage generated from the second converter circuit 246 is not supplied to the −2× charge pump 530 in the normal mode of the display 250.

According to an embodiment, the control circuit 220 may supply an ELVDD voltage output from the non-inverting buckbooster 810 included in the second converter circuit 246 to the −2× charge pump through the switch circuit 820 in the AOD mode of the display 260. The control circuit 220 may stop the output of the non-inverting buckbooster 510.

According to an embodiment, the control circuit 220 may monitor an ELVSS voltage supplied to the display panel 265 in the AOD mode of the display 260. For example, the control circuit 220 may identify a difference between the ELVSS voltage supplied to the display panel 265 and a target ELVSS voltage through the comparator 570. For example, the control circuit 220 may apply a voltage signal corresponding to a difference between the absolute value of the ELVSS voltage supplied to the display panel 265 and the absolute value of the target ELVSS voltage, as a gate voltage of the switch circuit 820 (or field-effect transistor). Therefore, the control circuit 220 may adjust the magnitude of the voltage (e.g., the ELVDD voltage) supplied from the non-inverting buckbooster 810 to the −2× charge pump 530. In an embodiment, when the difference between the absolute value of the ELVSS voltage supplied to the display panel 265 and the absolute value of the target ELVSS voltage increases, the control circuit 220 may apply a voltage signal increased by the difference to the switch circuit 820. In an embodiment, the magnitude of the voltage supplied to the −2× charge pump 530 through the switch circuit 820 may be increased based on the voltage signal. Further, the control circuit 220 may apply the voltage signal to the switch circuit 820 until the ELVSS voltage supplied to the display panel 265 matches the target ELVSS voltage. Therefore, the electronic device 201 may supply the target ELVSS voltage to the display panel 265 even though it does not include a separate regulator (e.g., LDO) at the output terminal of the −2× charge pump 530.

According to an embodiment, unlike the operation method of FIGS. 7 and 8, the electronic device 201 may not stop the output of the non-inverting buckbooster 510 in the AOD mode. For example, the electronic device 201 may activate both the first converter circuit 245 and the second converter circuit 246 and supply the ELVDD voltage and the ELVSS voltage to the display panel 265 in the AOD mode. For example, the control circuit 220 may generate the ELVSS voltage by supplying the first voltage BBOUT output from the non-inverting buckbooster 510 to the −2× charge pump 530 in the AOD mode. In addition, the control circuit 220 may generate the ELVDD voltage through the non-inverting buckbooster 810 included in the second converter circuit 246 in the AOD mode. Herein, the control circuit 220 may control the switch circuit 820 so that the voltage generated from the second converter circuit 246 (or the non-inverting buckbooster 810) is not supplied to the −2× charge pump 530.

Figure 9:
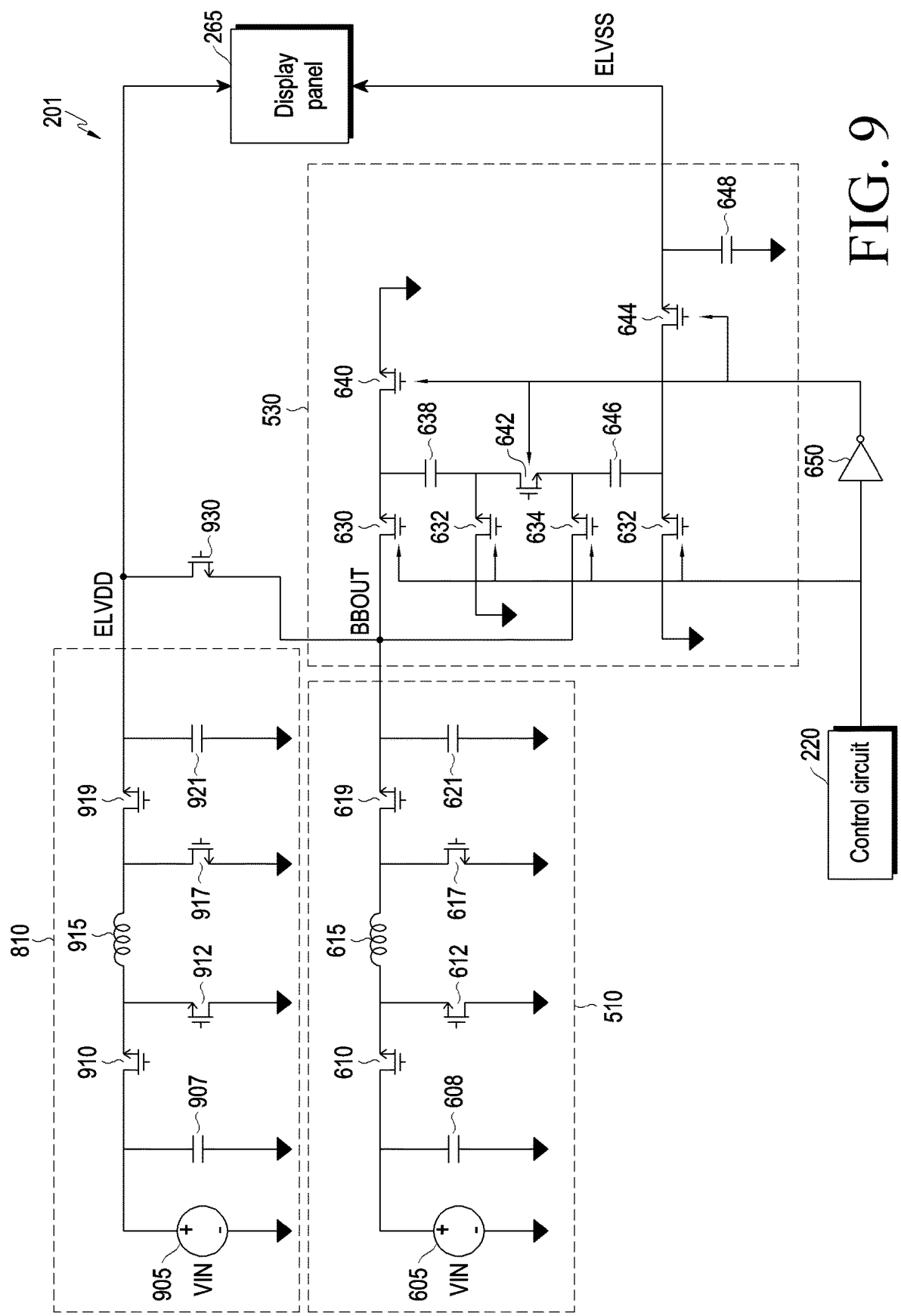
FIG. 9 is a diagram illustrating a non-inverting buckbooster and a charge pump included in a first converter circuit supporting an AOD mode, and a non-inverting buckbooster included in a second converter circuit according to an embodiment.

FIG. 9 is a diagram illustrating a non-inverting buckbooster and a charge pump included in a first converter circuit, and a non-inverting buckbooster included in a second converter circuit, which support the AOD mode according to an embodiment.

Referring to FIG. 9, according to an embodiment, the second converter circuit (e.g., the second converter circuit 246 of FIG. 2) may be implemented as the non-inverting buckbooster 810. The non-inverting buckbooster 810 may include an input power source 905, a plurality of capacitors 907 and 921, a plurality of transistors 910, 912, 917, and 919, and an inductor 915. For example, the plurality of transistors 910, 912, 917, and 919 may be implemented as field-effect transistors or MOSFETs. For example, the plurality of transistors 910, 912, 917, and 919 may be implemented with N-type MOSFETs (or NMOSes).

According to an embodiment, the non-inverting buckbooster 810 may be implemented the same as or similar to the non-inverting buckbooster 510 described with reference to FIG. 6. According to an embodiment, the non-inverting buckbooster 810 may generate and output an ELVDD voltage ELVDD based on a positive input voltage VIN supplied from the input power source 905. Herein, the plurality of transistors 910, 912, 917, and 919 included in the non-inverting buckbooster 810 may be turned on/off under the control of the control circuit 220.

According to an embodiment, the switch circuit 820 may be implemented as a bridge transistor 930. The control circuit 220 may connect the non-inverting buckbooster 810 to the −2× charge pump 530 through the bridge transistor 930 in the AOD mode of the display 260. For example, the control circuit 220 may control the plurality of transistors 610, 612, 617, and 619 included in the non-inverting buckbooster 510 to the off state (or open state) in the AOD mode of the display 260.

In the AOD mode of the display 260, an ELVSS voltage supplied to the display panel 265 may be monitored. For example, the control circuit 220 may identify a difference between the ELVSS voltage supplied to the display panel 265 and a target ELVSS voltage. For example, the control circuit 220 may apply a voltage signal corresponding to a difference between the absolute value of the ELVSS voltage supplied to the display panel 265 and the absolute value of the target ELVSS voltage, as a gate voltage of the bridge transistor 930. When the gate voltage of the bridge transistor 930 increases, the conduction resistance of the bridge transistor 930 may decrease. An output voltage of the bridge transistor 930 may be increased by as much as the decrease of the conduction resistance. Further, as the output voltage of the bridge transistor 930 increases, a voltage supplied to the −2× charge pump 530 may increase. For example, the control circuit 220 may adjust a voltage applied to an input terminal of the −2× charge pump 530 by applying a voltage signal to the bridge transistor 930. Therefore, the electronic device 201 may maintain supply of the target ELVSS voltage in the AOD mode of the display 260, even though it does not include a separate regulator (e.g., LDO) at the output terminal of the −2× charge pump 530.

Figure 10:
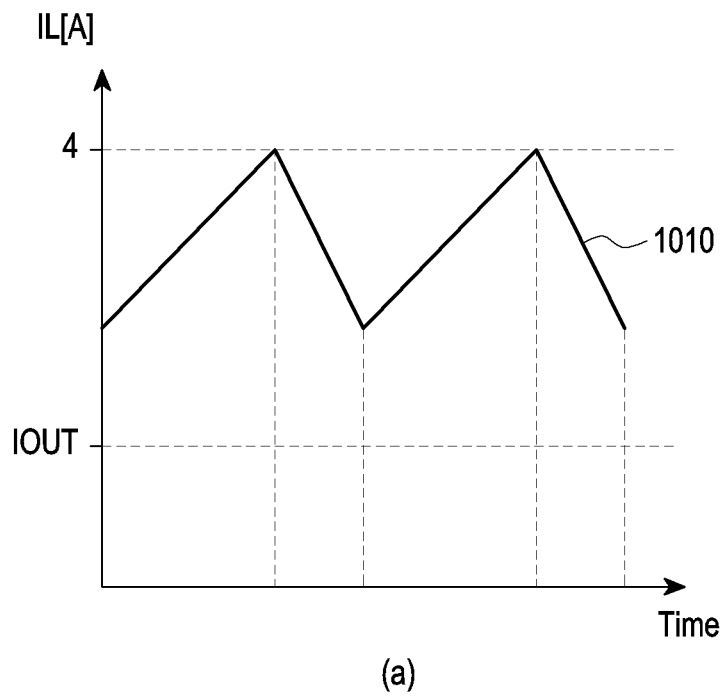
FIG. 10 is a diagram illustrating a current conducted in an inductor of a non-inverting buckbooster included in a first converter circuit according to an embodiment.
Figure 10:
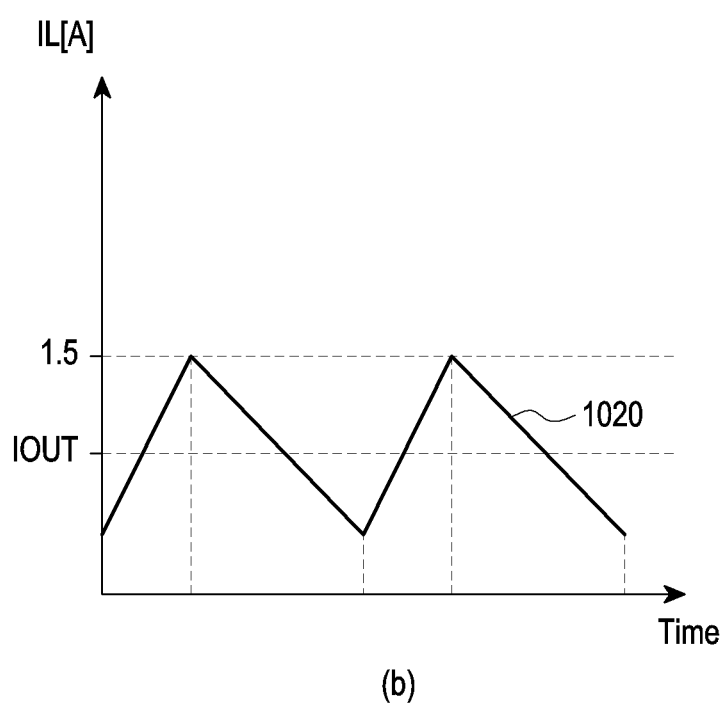

FIG. 10 is a diagram illustrating a current conducted in an inductor of a non-inverting buckbooster included in a first converter circuit according to an embodiment.

Referring to (a) of FIG. 10, a first graph 1010 may represent the magnitude of a current IL conducted in a plurality of inductors (e.g., 315 and 325 in FIG. 3) included in an inverting buckbooster (e.g., 301 in FIG. 3A).

According to an embodiment, the inverting buckbooster may output a negative ELVSS voltage (e.g., −9V) based on a positive input voltage VIN (e.g., 5V). Herein, a current may be conducted in each of the plurality of inductors 315 and 325. For example, a maximum value of the current conducted in the plurality of inductors 315 and 325 may be about 4 A. In this case, the maximum value of the current conducted in the plurality of inductors 315 and 325 may be greater than the magnitude IOUT (e.g., 0.75 A) of an output current of the inverting buckbooster 301. Further, a minimum value of the current conducted in the plurality of inductors 315 and 325 may be greater than the magnitude IOUT of the output current of the inverting buckbooster.

Referring to (b) of FIG. 10, a second graph 1020 may represent the magnitude of a current IL conducted in an inductor (e.g., 365 of FIG. 3B or 615 of FIG. 6) included in a non-inverting buckbooster (e.g., 302 in FIG. 3B or 510 in FIG. 5).

According to an embodiment, the non-inverting buckbooster may output a positive first voltage BBOUT (e.g., 4.5V) based on a positive input voltage VIN (e.g., 5V). Herein, a current may be conducted in the inductor 365 or 615. For example, a maximum value of the current conducted in the inductor 365 or 615 may be 1.5 A. A maximum value of the current conducted in the inductor 365 or 615 may be greater than the magnitude IOUT (e.g., 0.75 A) of an output current of the non-inverting buckbooster 302 or 510. However, the maximum value (e.g., 1.5 A) of the current conducted in the inductor 365 or 615 may be much less than a maximum value (e.g., 4 A) of a current conducted in the inductors 315 and 325 included in the inverting buckbooster 301. Further, a minimum value of the current conducted through the inductor 365 or 615 may be less than the magnitude IOUT of the output current of the non-inverting buckbooster 302 or 510.

Accordingly, the disclosure may reduce the magnitude of the current conducted in the inductor 365 or 615 included in the non-inverting buckbooster 510 using the first converter circuit 245 including the non-inverting buckbooster 510.

The electronic device 201 according to an embodiment may include the display 260 including the display panel 265, the first converter circuit 245 including the non-inverting buckbooster 510 and the charge pump 530 and configured to supply a negative first bias voltage to the display panel, and the control circuit 220. The control circuit according to an embodiment may be configured to identify a target first bias voltage to be supplied to the display panel. The control circuit according to an embodiment may be configured to output a first voltage corresponding to half of an absolute value of the target first bias voltage to the charge pump, using the non-inverting buckbooster. The control circuit according to an embodiment may be configured to generate, through the charge pump, a second voltage by reversing a sign of the first voltage and converting a magnitude of the first voltage by a factor of two. The control circuit according to an embodiment may be configured to supply the second voltage as the first bias voltage to the display panel.

The control circuit according to an embodiment may be configured to monitor the first bias voltage supplied to the display panel, and when identifying that an absolute value of the first bias voltage is less than the absolute value of the target first bias voltage, increase an output voltage of the non-inverting buckbooster such that the charge pump outputs a voltage corresponding to the target first bias voltage.

The control circuit according to an embodiment may be configured to monitor the first bias voltage supplied to the display panel, and when identifying that the absolute value of the first bias voltage is greater than the absolute value of the target first bias voltage, decrease the output voltage of the non-inverting buckbooster such that the charge pump outputs the voltage corresponding to the target first bias voltage.

The electronic device according to an embodiment may further include the second converter circuit 246 including the non-inverting buckbooster 810 and configured to supply a positive second bias voltage to the display panel. The electronic device according to an embodiment may further include the switch circuit 820 or 930 disposed between the first converter circuit and the second converter circuit. The control circuit according to an embodiment may be configured to control the switch circuit to connect the second converter circuit and the charge pump to each other in an AOD mode of the display.

The control circuit according to an embodiment may be configured to stop output of the non-inverting buckbooster included in the first converter circuit in the AOD mode of the display.

The control circuit according to an embodiment may be configured to provide the positive second bias voltage output from the second converter circuit, to the charge pump through the switch circuit in the AOD mode.

The control circuit according to an embodiment may be configured to control the switch circuit to connect the non-inverting buckbooster and the charge pump included in the first converter circuit to each other in a normal mode of the display.

The switch circuit according to an embodiment may include a field-effect transistor.

The control circuit according to an embodiment may be configured to monitor the first bias voltage supplied to the display panel, and apply a voltage corresponding to a difference between the absolute value of the first bias voltage and the absolute value of the target first bias voltage as a gate voltage of the field effect transistor.

The display according to an embodiment may be implemented as an OLED display.

In a method of operating the electronic device 201 according to an embodiment, the electronic device may include the display 260 including the display panel 265 and the first converter circuit 245 configured to supply a negative first bias voltage to the display panel, and the first converter circuit may include the non-inverting buckbooster 510 and the charge pump 530. The method of operating the electronic device according to an embodiment may include identifying a target first bias voltage to be supplied to the display panel. The method of operating the electronic device according to an embodiment may include outputting a first voltage corresponding to half of an absolute value of the target first bias voltage to the charge pump, using the non-inverting buckbooster. The method of operating the electronic device according to an embodiment may include generating, through the charge pump, a second voltage by reversing a sign of the first voltage and converting a magnitude of the first voltage by a factor of two. The method of operating the electronic device according to an embodiment may include supplying the second voltage as the first bias voltage to the display panel.

The method of operating the electronic device according to an embodiment may further include monitoring the first bias voltage supplied to the display panel. The method of operating the electronic device according to an embodiment may further include, when it is identified that an absolute value of the first bias voltage is less than the absolute value of the target first bias voltage, increasing an output voltage of the non-inverting buckbooster such that the charge pump outputs a voltage corresponding to the target first bias voltage.

The method of operating the electronic device according to an embodiment may further include monitoring the first bias voltage supplied to the display panel. The method of operating the electronic device according to an embodiment may further include, when it is identified that the absolute value of the first bias voltage is greater than the absolute value of the target first bias voltage, decreasing the output voltage of the non-inverting buckbooster such that the charge pump outputs the voltage corresponding to the target first bias voltage.

The electronic device according to an embodiment may further include the second converter circuit 246 configured to supply a positive second bias voltage applied to the display panel and the switch circuit 820 or 930 disposed between the first converter circuit and the second converter circuit, and the second converter circuit may include the non-inverting buckbooster 810. The method of operating the electronic device according to an embodiment may further include connecting the second converter circuit and the charge pump to each other in an AOD mode of the display.

The method of operating the electronic device according to an embodiment may further include stopping output of the non-inverting buckbooster included in the first converter circuit in the AOD mode of the display.

The method of operating the electronic device according to an embodiment may further include providing the positive second bias voltage output from the second converter circuit, to the charge pump through the switch circuit in the AOD mode.

The method of operating the electronic device according to an embodiment may further include controlling the switch circuit to connect the non-inverting buckbooster and the charge pump included in the first converter circuit to each other in a normal mode of the display.

The switch circuit according to an embodiment may include a field-effect transistor.

The method of operating the electronic device according to an embodiment may further include monitoring the first bias voltage supplied to the display panel. The method of operating the electronic device according to an embodiment may further include applying a voltage corresponding to a difference between the absolute value of the first bias voltage and the absolute value of the target first bias voltage as a gate voltage of the field effect transistor.

The method according to an embodiment, wherein the display may be implemented as an OLED display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display including a display panel;
   a first converter circuit including a non-inverting buckbooster and a charge pump and configured to supply a negative first bias voltage to the display panel; and
   a control circuit,
   wherein the control circuit is configured to:
   identify a target first bias voltage to be supplied to the display panel, output a first voltage corresponding to half of an absolute value of the target first
   bias voltage to the charge pump, using the non-inverting buckbooster, generate, through the charge pump, a second voltage by reversing a sign of
   the first voltage and converting a magnitude of the first voltage by a factor of two, and supply the second voltage as the first bias voltage to the display panel.

2. The electronic device of claim 1, wherein the control circuit is configured to:
   monitor the first bias voltage supplied to the display panel, and
   when identifying that an absolute value of the first bias voltage is less than the absolute value of the target first bias voltage, increase an output voltage of the non-inverting buckbooster such that the charge pump outputs a voltage corresponding to the target first bias voltage.

3. The electronic device of claim 1, wherein the control circuit is configured to:
   monitor the first bias voltage supplied to the display panel, and
   when identifying that the absolute value of the first bias voltage is greater than the absolute value of the target first bias voltage, decrease output voltage of the non-inverting buckbooster such that the charge pump outputs a voltage corresponding to the target first bias voltage.

4. The electronic device of claim 1, further comprising:
   a second converter circuit including a non-inverting buckbooster and configured to supply a positive second bias voltage to the display panel; and
   a switch circuit disposed between the first converter circuit and the second converter circuit,
   wherein the control circuit is configured to control the switch circuit to connect the second converter circuit and the charge pump to each other in an always on display, AOD, mode of the display.

5. The electronic device of claim 4, wherein the control circuit is configured to stop output of the non-inverting buckbooster included in the first converter circuit in the AOD mode of the display.

6. The electronic device of claim 4, wherein the control circuit is configured to provide the positive second bias voltage output from the second converter circuit, to the charge pump through the switch circuit in the AOD mode.

7. The electronic device of claim 4, wherein the control circuit is configured to control the switch circuit to connect the non-inverting buckbooster and the charge pump included in the first converter circuit to each other in a normal mode of the display.

8. The electronic device of claim 7, wherein the switch circuit includes a field-effect transistor.

9. The electronic device of claim 8, wherein the control circuit is configured to:
   monitor the first bias voltage supplied to the display panel, and
   apply a voltage corresponding to a difference between the absolute value of the first bias voltage and the absolute value of the target first bias voltage as a gate voltage of the field-effect transistor.

10. The electronic device of claim 1, wherein the display is implemented as an organic light emitting diode, OLED, display.

11. A method of operating an electronic device including a display including a display panel and a first converter circuit configured to supply a negative first bias voltage to the display panel, wherein the first converter circuit includes a non-inverting buckbooster and a charge pump, the method comprising:
    identifying a target first bias voltage to be supplied to the display panel;
    outputting a first voltage corresponding to half of an absolute value of the target first bias voltage to the charge pump, using the non-inverting buckbooster;
    generating, through the charge pump, a second voltage by reversing a sign of the first voltage and converting a magnitude of the first voltage by a factor of two; and
    supplying the second voltage as the first bias voltage to the display panel.

12. The method of claim 11, further comprising:
    monitoring the first bias voltage supplied to the display panel; and
    when it is identified that an absolute value of the first bias voltage is less than the absolute value of the target first bias voltage, increasing an output voltage of the non-inverting buckbooster such that the charge pump outputs a voltage corresponding to the target first bias voltage.

13. The method of claim 11, further comprising:
    monitoring the first bias voltage supplied to the display panel; and
    when it is identified that the absolute value of the first bias voltage is greater than the absolute value of the target first bias voltage, decreasing output voltage of the non-inverting buckbooster such that the charge pump outputs a voltage corresponding to the target first bias voltage.

14. The method of claim 11, wherein the electronic device further includes a second converter circuit configured to supply a positive second bias voltage to the display panel and a switch circuit disposed between the first converter circuit and the second converter circuit, wherein the second converter circuit includes a non-inverting buckbooster, and
    wherein the method further comprises controlling the switch circuit to connect the second converter circuit and the charge pump to each other in an always on display, AOD, mode of the display.

15. The method of claim 14, further comprising stopping output of the non-inverting buckbooster included in the first converter circuit in the AOD mode of the display.

* * * * *